US012573646B2

(12) United States Patent
Kato et al.

(10) Patent No.: US 12,573,646 B2
(45) Date of Patent: Mar. 10, 2026

(54) HEAT INSULATION STRUCTURE FOR HIGH-TEMPERATURE REACTION ROOM

(71) Applicant: MITSUBISHI HEAVY INDUSTRIES, LTD., Tokyo (JP)

(72) Inventors: Yoshiki Kato, Yokohama (JP); Shigenori Suemori, Tokyo (JP); Koji Miyamoto, Yokohama (JP); Kenta Araki, Yokohama (JP); Keijo Hara, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 720 days.

(21) Appl. No.: 18/010,015

(22) PCT Filed: Dec. 25, 2020

(86) PCT No.: PCT/JP2020/048732
§ 371 (c)(1),
(2) Date: Dec. 13, 2022

(87) PCT Pub. No.: WO2022/004025
PCT Pub. Date: Jan. 6, 2022

(65) Prior Publication Data
US 2023/0253582 A1 Aug. 10, 2023

(30) Foreign Application Priority Data
Jul. 2, 2020 (JP) ................................. 2020-114593

(51) Int. Cl.
*H01M 8/04007* (2016.01)
*C25B 1/02* (2006.01)
(Continued)

(52) U.S. Cl.
CPC ........... *H01M 8/04067* (2013.01); *C25B 1/02* (2013.01); *C25B 9/19* (2021.01); *C25B 9/60* (2021.01);
(Continued)

(58) Field of Classification Search
None
See application file for complete search history.

(56) References Cited

U.S. PATENT DOCUMENTS

2005/0123814 A1 6/2005 Calhoon
2005/0181265 A1* 8/2005 Clauss ................ H01M 8/2432
429/129
(Continued)

FOREIGN PATENT DOCUMENTS

CN 101390228 A 3/2009
JP 2016-115629 A 6/2016
TW 200818586 A 4/2008

OTHER PUBLICATIONS

Office Action dated Apr. 26, 2022, issued in counterpart TW Patent Application No. 110107242 (7 pages).
(Continued)

*Primary Examiner* — Haroon S. Sheikh
(74) *Attorney, Agent, or Firm* — WHDA, LLP

(57) ABSTRACT

A heat insulation structure for a high-temperature reaction room includes a heat insulating body surrounding the reaction room. The heat insulating body contains a binder component including a metal element and is arranged so as to face an insulating film disposed on a cell stack. Transfer of metal ions originating in the metal element from the heat insulating body toward the insulating film is suppressed by a metal ion transfer suppression means.

15 Claims, 9 Drawing Sheets

(51) Int. Cl.

| | |
|---|---|
| *C25B 9/19* | (2021.01) |
| *C25B 9/60* | (2021.01) |
| *C25B 13/07* | (2021.01) |
| *H01M 8/04014* | (2016.01) |
| *H01M 8/04701* | (2016.01) |
| *H01M 8/04746* | (2016.01) |
| *H01M 8/12* | (2016.01) |
| *H01M 8/1231* | (2016.01) |
| *H01M 8/2425* | (2016.01) |
| *H01M 8/2457* | (2016.01) |

(52) U.S. Cl.

CPC ......... *C25B 13/07* (2021.01); *H01M 8/04014* (2013.01); *H01M 8/04708* (2013.01); *H01M 8/04731* (2013.01); *H01M 8/04753* (2013.01); *H01M 8/1231* (2016.02); *H01M 8/2425* (2013.01); *H01M 8/2457* (2016.02); *H01M 2008/1293* (2013.01)

(56) References Cited

U.S. PATENT DOCUMENTS

| | | |
|---|---|---|
| 2008/0003472 A1 | 1/2008 | Miyamoto et al. |
| 2008/0182146 A1* | 7/2008 | Nakamura .......... H01M 8/0668 429/434 |
| 2009/0220765 A1 | 9/2009 | Okamura et al. |

OTHER PUBLICATIONS

International Search Report dated Mar. 16, 2021, issued in counterpart International Application No. PCT/JP2020/048732 (2 pages).

* cited by examiner

HEAT INSULATION STRUCTURE FOR HIGH-TEMPERATURE REACTION ROOM

TECHNICAL FIELD

The present disclosure relates to a heat insulation structure for a high-temperature reaction room.

BACKGROUND

Fuel cells with characteristics such as excellent power generation efficiency and environmental response are known as one type of power generation devices which utilize a power generation method based on an electrochemical reaction. Of these, a solid oxide fuel cell (SOFC) uses ceramics such as zirconia ceramics as an electrolyte, and generates electricity by using carbon monoxide and hydrogen generated by reforming fuel such as city gas, natural gas, or coal gasification gas. Further, the solid oxide fuel cell is known as a highly efficient high-temperature fuel cell with a wide range of applications, which includes a reaction room (power generation chamber) where a high operating temperature of approximately 700° C. to 1,100° C. is reached in order to increase ionic conductivity.

For example, Patent Document 1 discloses an example of this type of solid oxide fuel cell, and describes a configuration for generating electric power by reacting an oxidant gas and a fuel gas supplied to the inside and outside of a tubular cell stack (cell tube) with an anode and a cathode.

CITATION LIST

Patent Literature

Patent Document 1: JP2016-115629A

SUMMARY

Technical Problem

As described above, since the solid oxide fuel cell includes the reaction room having the high operating temperature, the reaction room provided with a single fuel cell may at least partially be surrounded by a heat insulating body in order to quickly increase a temperature at the time of startup or in order to efficiently maintain the high operating temperature. Meanwhile, in order to extract the electricity generated in the reaction room to the outside, it is necessary to extend the vicinity of an end of a cell stack having the single fuel cell in the reaction room to the outside of the heat insulating body. Thus, the heat insulating body is provided with a through hole formed so as to allow the vicinity of the end of the cell stack to be inserted.

In the vicinity of such through hole, it is designed such that not a little clearance is secured between a surface of the heat insulating body and a surface of the cell stack inserted through the through hole. In reality, however, due to a factor such as a design error, the surface of the cell stack may contact the surface of the heat insulating body. When the cell stack and the heat insulating body thus contact each other, an insulating film made of an insulating material is disposed on the surface of the cell stack in order to protect the cell stack.

By the way, a binder component including a metal element may be used in the heat insulating body for the purpose of securing moldability, strength/workability, or the like. The binder component of this kind is used which includes an alkali metal such as sodium as a stabilizer for colloidal silica ($SiO_2$ or its hydrate), for example. If the heat insulating body containing such binder component is in contact with the cell stack for the long period of time under the high-temperature environment, the concentration of the metal element progresses in the heat insulating body and a molten phase may be formed in an operating temperature range. For example, if the heat insulating body, which contains, as the binder component, colloidal silica including the alkali metal such as sodium as described above, is in contact with an insulating film containing, alumina ($Al_2O_3$) for a long period of time under a high-temperature environment, a melting point decreases and a molten phase may be formed at around 790° C. Under such circumstances, if a relatively high negative potential is applied between the heat insulating body and the cell stack, an ionized concentrated metal element moves from a heat insulating body side to a cell stack side, which causes alternation of the insulating film on the cell stack or deterioration in insulating property. If this progresses further, electrical breakdown may be caused by a short-circuit current.

At least one embodiment of the present disclosure was made in view of the above, and an object of the present disclosure is to provide the heat insulation structure for the high-temperature reaction room that can prevent the alternation of the insulating film or the deterioration in insulating property when the cell stack is in contact with the heat insulating body for the long period of time under the high-temperature environment.

Solution to Problem

In order to solve the above-described problems, a heat insulation structure for a high-temperature reaction room according to at least one embodiment of the present disclosure includes: a cell stack including at least one reaction room; a heat insulating, body which contains a binder component including a metal element, at least partially surrounds the reaction room, and is arranged so as to face an insulating film disposed on the cell stack; and a metal ion transfer suppression means configured to suppress transfer of metal ions originating in the metal element from the heat insulating body toward the insulating film.

Advantageous Effects

According to at least one embodiment of the present disclosure, it is possible to provide a heat insulation structure for a high-temperature reaction room that can prevent alternation of an insulating film or deterioration in insulating property when a cell stack is in contact with a heat insulating body for a long period of time under a high-temperature environment.

DETAILED DESCRIPTION

Figure 1:
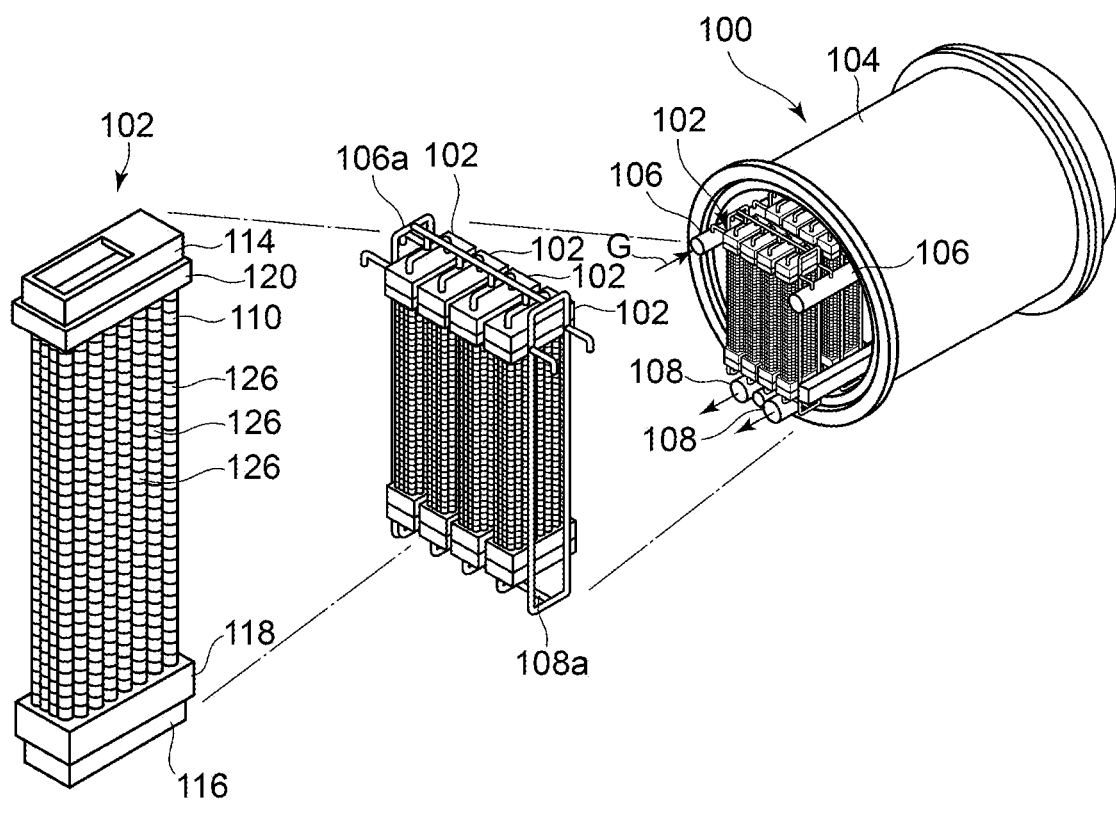
FIG. 1 is a perspective view showing the overall configuration of a solid oxide fuel cell module according to an embodiment of the present disclosure.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

Figure 2:
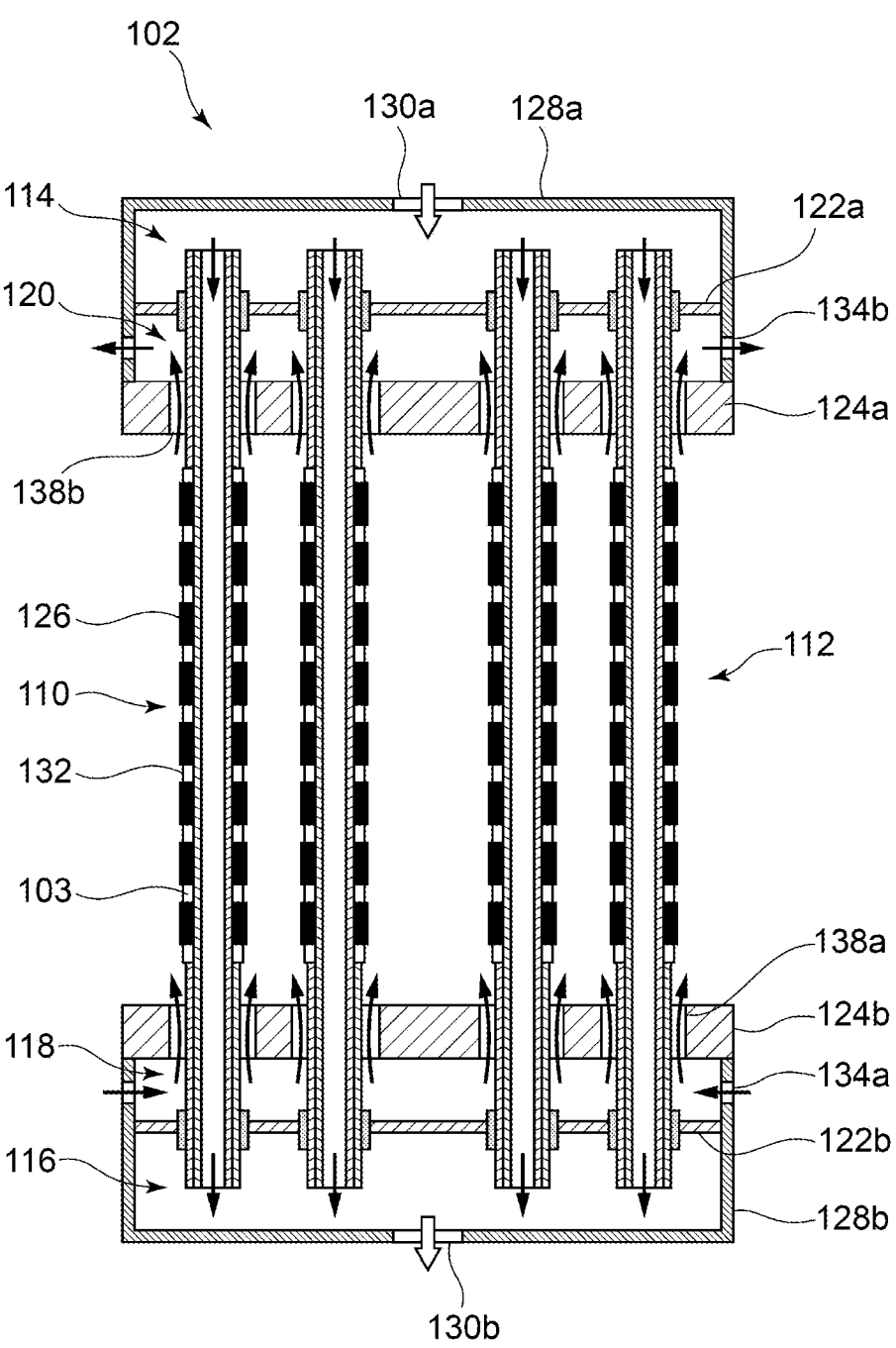
FIG. 2 is a cross-sectional view showing the internal configuration of a solid oxide fuel cell cartridge of FIG. 1.

FIG. 1 is a perspective view showing the overall configuration of a solid oxide fuel cell module 100 according to an embodiment of the present disclosure. FIG. 2 is a cross-sectional view showing the internal configuration of a solid oxide fuel cell cartridge 102 of FIG. 1.

The solid oxide fuel cell module 100 includes the plurality of solid oxide fuel cell cartridges 102, and a pressure vessel 104 for housing the plurality of solid oxide fuel cell cartridges 102. Further, the solid oxide fuel cell module 100 includes fuel gas supply pipes 106 and a plurality of fuel gas supply branch pipes 106a. Further, the solid oxide fuel cell module 100 includes fuel gas exhaust pipes 108 and a plurality of fuel gas exhaust branch pipes 108a. Further, the solid oxide fuel cell module 100 includes an oxidant supply pipe (illustration omitted) and an oxidant supply branch pipe (illustration omitted). Further, the solid oxide fuel cell module 100 includes an oxidant exhaust pipe (illustration omitted) and a plurality of oxidant exhaust branch pipes (illustration omitted).

The fuel gas supply pipes 106 are disposed in the pressure vessel 104, are connected to a fuel supply system (illustration omitted) for supplying a fuel gas G having a predetermined gas composition and a predetermined flow rate according to a power generation amount of the solid oxide fuel cell module 100, and are connected to the plurality of fuel gas supply branch pipes 106a. The fuel gas supply pipes 106 branch and introduce the fuel gas, which has the predetermined flow rate and is supplied from the fuel supply system (illustration omitted), to the plurality of fuel gas supply branch pipes 106a.

The fuel gas supply branch pipes 106a are connected to the fuel gas supply pipes 106 and are connected to the plurality of solid oxide fuel cell cartridges 102. The fuel gas supply branch pipes 106a introduce the fuel gas supplied from the fuel gas supply pipes 106 to the plurality of solid oxide fuel cell cartridges 102 at the substantially equal flow rate, and substantially uniformize power generation performance of the plurality of solid oxide fuel cell cartridges 102.

The fuel gas exhaust branch pipes 108a are connected to the plurality of solid oxide fuel cell cartridges 102 and are connected to the fuel gas exhaust pipes 108. The fuel gas exhaust branch pipes 108a introduce the exhaust fuel gas exhausted from the solid oxide fuel cell cartridges 102 to the fuel gas exhaust pipes 108. Further, the fuel gas exhaust pipes 108 are connected to the plurality of feel gas exhaust branch pipes 108a, and a part of each of the fuel gas exhaust pipes 108 is disposed outside the pressure vessel 104. The fuel gas exhaust pipes 108 introduce the exhaust fuel gas derived from the fuel gas exhaust branch pipes 108a at the substantially equal flow rate to a fuel gas exhaust system (illustration omitted) outside the pressure vessel 104.

The pressure vessel 104 is operated at an internal pressure of 0.1 MPa to approximately 1 MPa and at an internal temperature of atmospheric temperature to approximately 550° C., and a material is used which has pressure resistance and corrosion resistance to an oxidizing agent such as oxygen contained in an oxidizing gas. For example, a stainless steel material such as SUS304 is suitable.

As shown in FIG. 2, the solid oxide fuel cell cartridge 102 includes a plurality of cell stacks 110, a reaction room 112 (power generation room), a fuel gas supply chamber 114, a fuel gas exhaust chamber 116, an oxidant supply chamber 118, and an oxidant exhaust chamber 120. Further, the solid oxide fuel cell cartridge 102 includes an upper tube plate 122a, a lower tube plate 122b, an upper heat insulating body 124a, and a lower heat insulating body 124b. The upper heat insulating body 124a, and the lower heat insulating body 124b constitute at least a part of the heat insulation structure for the reaction room 112.

The reaction room 112 is an area in which a plurality of single fuel cells 126 of each cell stack 110 are disposed and the fuel gas and the oxidizing gas are electrochemically reacted to generate electricity. A temperature in the vicinity of the central portion of the reaction room 112 in the longitudinal direction of the cell stack 110 becomes a high-temperature atmosphere of approximately 700° C. to 1,100° C. during a steady operation of the solid oxide fuel cell module 100. In order to maintain such high-temperature atmosphere of the reaction room 112, the reaction room 112 is formed between the upper heat insulating body 124a and the lower heat insulating body 124b, thereby partially being surrounded by the upper heat insulating body 124a and the lower heat insulating body 124b.

The fuel gas supply chamber 114 is an area surrounded by the upper tube plate 122a and an upper casing 128a of the solid oxide fuel cell cartridge 102. Further, the fuel gas supply chamber 114 communicates with the fuel gas supply branch pipe 106a (see FIG. 1) through a fuel gas supply hole 130a disposed in the upper casing 128a. Further, in the fuel gas supply chamber 114, one end of the cell stack 110 is disposed such that the inside of a substrate tube 132 of the cell stack 110 is open to the fuel gas supply chamber 114. The fuel gas supply chamber 114 introduces the fuel gas, which is supplied from the fuel gas supply branch pipe 106a (illustration omitted) via the fuel gas supply hole 130a, into the substrate tubes 132 of the plurality of cell stacks 101 at the substantially uniform flow rate and substantially uniformizes the power generation performance of the plurality of cell stacks 101.

The fuel gas exhaust chamber 116 is an area surrounded by the lower tube plate 122b and a lower casing 128b of the solid oxide fuel cell cartridge 102. Further, the fuel gas exhaust chamber 116 communicates with the fuel gas exhaust branch pipe 108a (see FIG. 1) through a fuel gas exhaust hole 130 disposed in the lower casing 128b. Further, in the fuel gas exhaust chamber 116, another end of the cell stack 110 is disposed such that the inside of the substrate tube 132 of the cell stack 110 is open to the fuel gas exhaust chamber 116. The fuel gas exhaust chamber 116 collects the exhaust fuel gas, which is supplied to the fuel gas exhaust chamber 116 through the inside of the substrate tubes 132 of the plurality of cell stacks 101, and introduces the collected exhaust fuel gas to the fuel gas exhaust branch pipe 108*a* (illustration omitted) via the fuel gas exhaust hole 130*b*.

The oxidant supply chamber 118 is an area surrounded by the lower casing 128*b*, the lower tribe plate 12*b*, and the lower heat insulating body 124*b* of the solid oxide fuel cell cartridge 102. Further, the oxidant supply chamber 118 communicates with the oxidant supply branch pipe (see FIG. 1) through an oxidant supply hole 134*a*, disposed in the lower casing 125*b*. The oxidant supply chamber 118 introduces the oxidizing gas, which has the predetermined flow rate and is supplied from the oxidant supply branch pipe (see FIG. 1) via the oxidant supply hole 134*a*, to the reaction room 112 via an oxidant supply gap 138*a* described later.

The gas composition and supply amount of the oxidizing gas are decided according to the power generation amount of the solid oxide fuel cell module 100.

The oxidant exhaust chamber 120 is an area surrounded by the upper casing 128*a*, the upper tube plate 122*a*, and the upper heat insulating body 124*a* of the solid oxide fuel cell cartridge 102. Further, the oxidant exhaust chamber 120 communicates with the oxidant exhaust branch pipes (see FIG. 1) through an oxidant exhaust hole 134*b* disposed in the upper casing 128*a*. The oxidant exhaust chamber 120 introduces the exhaust oxidized gas, which is exhausted to the oxidant exhaust chamber 120 via an oxidant exhaust gap 138*b* described later, from the reaction room 112 to the oxidant exhaust branch pipes (see FIG. 1) via the oxidant exhaust hole 134*b*.

The upper tube plate 122*a* is fixed to side plates of the upper casing 128*a* to substantially be parallel to a top plate of the upper casing 128*a* and the upper heat insulating body 124*a*, between the top plate of the upper casing 128*a* and the upper heat insulating body 124*a*. Further, the upper tube plate 122*a* has a plurality of through holes corresponding to the number of cell stacks 110 provided in the solid oxide fuel cell cartridge 102, and the cell stacks 110 are inserted into the through holes, respectively. The upper tube plate 122*a* air-tightly supports the one end of each of the plurality of cell stacks 110 via either or both of a sealing member and an adhesive material (not shown), and isolates the fuel gas supply chamber 114 from the oxidant exhaust chamber 120.

The lower tube plate 122*b* is fixed to side plates of the lower casing 128*b* to substantially be parallel to a bottom plate of the lower casing 128*b* and the lower heat insulating body 124*b*, between the bottom plate of the lower casing 128*b* and the lower heat insulating body 124*b*. Further, the lower tube plate 122*b* has a plurality of through holes corresponding to the number of cell stacks 110 provided in the solid oxide fuel cell cartridge 102, and the cell stacks 110 are inserted into the through holes, respectively. The lower tube plate 122*b* air-tightly supports the another end of each of the plurality of cell stacks 110 via either or both of a sealing member and an adhesive material (not shown), and isolates the fuel gas exhaust chamber 116 from the oxidant supply chamber 118.

The upper heat insulating body 124*a* is disposed at a lower end of the upper casing 128*a* to substantially be parallel to the top plate of the upper casing 128*a* and the upper tube plate 122*a* and is fixed to the side plates of the upper casing 128*a* so as to at least partially surround the reaction room 112. Further, the upper heat insulating body 124*a* is provided with a plurality of through holes corresponding to the number of cell stacks 110 provided in the solid oxide fuel cell cartridge 102. Each of the through holes has a diameter which is set to be larger than an outer diameter of the cell stack 110. The upper heat insulating body 124*a* has the oxidant exhaust gap 138*b* which is formed between an inner surface of the through hole and an outer surface of the cell stack 110 inserted through the upper heat insulating body 124*a*.

The upper heat insulating body 124*a* separates the reaction room 112 and the oxidant exhaust chamber 120, and suppresses a decrease in strength or an increase in corrosion by an oxidizing agent contained in the oxidizing gas due to an increased temperature of the atmosphere around the upper tube plate 122*a*. The upper tube plate 122*a* or the like is made of a metal material having high temperature durability such as Inconel, and thermal deformation is prevented which is caused by exposing the upper tube plate 122*a* or the like to a high temperature in the reaction room 112 and increasing a temperature difference from the upper casing 128*a*. Further, the upper heat insulating body 124*a* introduces an exhaust oxidized gas, which has passed through the reaction room 112 and exposed to the high temperature, to the oxidant exhaust chamber 120 through the oxidant exhaust gap 138*b*.

According to the present embodiment, due to the structure of the solid oxide fuel cell cartridge 102 described above, the fuel gas and the oxidizing gas oppositely flow inside and outside the cell stack 110. Consequently, the exhaust oxidized gas exchanges heat with the fuel gas supplied to the reaction room 112 through the inside of the substrate tube 132, is cooled to a temperature at which the upper tube plate 122*a* or the like made of the metal material is not subjected to deformation such as buckling, and is supplied to the oxidant exhaust chamber 120. Further, the fuel gas is raised in temperature by the heat exchange with the exhaust oxidized gas exhausted from the reaction room 112 and supplied to the reaction room 112. As a result, the fuel gas, which is preheated and raised in temperature to a temperature suitable for power generation without using a heater or the like, can be supplied to the reaction room 112.

The lower heat insulating body 124*b* is disposed at a upper end of the lower casing 128*b* to substantially be parallel to the bottom plate of the lower casing 128*b* and the lower tube plate 122*b* and is fixed to the side plates of the upper casing 128*a* so as to at least partially surround the reaction room 112. Further, the lower heat insulating body 124*b* is provided with a plurality of through holes corresponding to the number of cell stacks 110 provided in the solid oxide fuel cell cartridge 102. Each of the through holes has a diameter which inset to be larger than the outer diameter of the cell stack 110. The lower heat insulating body 124*b* has the oxidant supply gap 138*a* which is formed between an inner surface of the through hole and the outer surface of the cell stack 110 inserted through the lower heat insulating body 124*b*.

The lower heat insulating body 124*b* separates the reaction room 112 and the oxidant supply chamber 118, and suppresses a decrease in strength or an increase in corrosion by an oxidizing agent contained in the oxidizing gas due to an increased temperature of the atmosphere around the lower tube plate 122*b*. The lower tube plate 122*b* or the like is made of the metal material having high temperature durability such as Inconel, and deformation is prevented which is caused by exposing the lower tube plate 122*b* or the like to a high temperature and increasing a temperature difference from the lower casing 128*b*. Further, the lower heat insulating body 124*b* introduces the oxidizing gas, which is supplied to the oxidant supply chamber 118, to the reaction room 112 through the oxidant supply gap 138*a*.

According to the present embodiment, due to the structure of the solid oxide fuel cell cartridge 102 described above, the fuel gas and the oxidizing gas oppositely flow inside and outside the cell stack 110. Consequently, the exhaust fuel gas having passed through the reaction room 112 through the inside of the substrate tube 132 exchanges heat with the oxidizing gas supplied to the reaction room 112, is cooled to a temperature at which the lower tube plate 122b or the like made of the metal material is not subjected to deformation such as buckling, and is exhausted to the fuel gas exhaust chamber 116. Further, the oxidizing gas is raised in temperature by the heat exchange with the exhaust fuel gas and supplied to the reaction room 112. As a result, the oxidizing gas, which is raised to a temperature needed for power generation without using the heater or the like, can be supplied to the reaction room 112.

Figure 3:
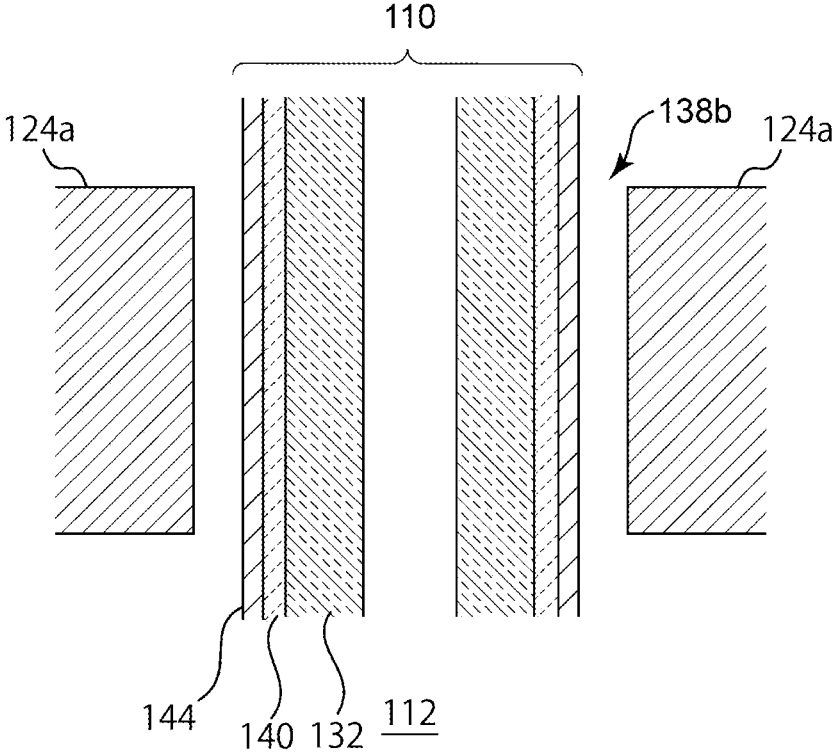
FIG. 3 is an enlarged view of the vicinity of an oxidant exhaust gap of FIG. 2.

Herein, FIG. 3 is an enlarged view of the vicinity of an oxidant exhaust gap 138b of FIG. 2. After being derived to the vicinity of the end of the cell stack 110 by a collector 140 which is a lead film made of Ni/YSZ or the like connected to the plurality of single fuel cells 126 (see FIG. 2), DC power generated in the reaction room 112 is collected by a current collection mechanism 142 of the solid oxide fuel cell cartridge 102 described later, and is taken out of each solid oxide fuel cell cartridge 102. As shown in FIG. 3, the collector 140 is disposed on the substrate tube 132, and a further upper layer side of the collector 140 is covered with a seal insulating film 111 made of an insulating material such as alumina ($Al_2O_3$).

The configuration in the vicinity of the oxidant supply gap 138a (not shown substantially the same as the configuration in the vicinity of the oxidant exhaust gap 138b shown in FIG. 3. Further, in the present specification, matters related to the configuration in the vicinity of the oxidant exhaust gap 138b shown in FIG. 3 are also applicable to the vicinity of the oxidant supply gap 138a, unless otherwise specified.

Figure 4:
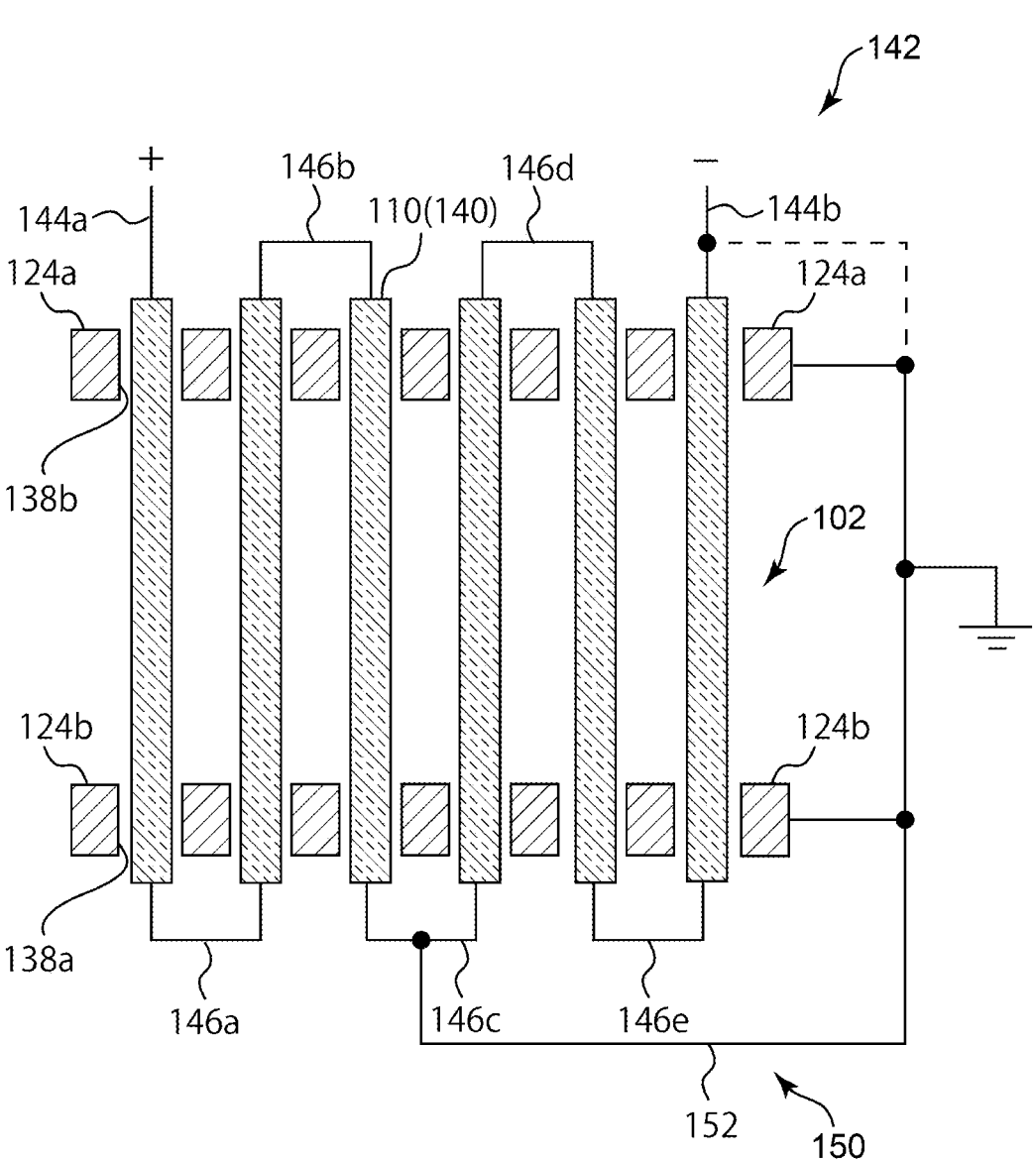
FIG. 4 is a schematic view showing the internal configuration of the solid oxide fuel cell cartridge together with a current collection mechanism of a plurality of cell stacks.

FIG. 4 is a schematic view showing the internal configuration of the solid oxide fuel cell cartridge 102 together with the current collection mechanism 142 of the plurality of cell stacks 110. In FIG. 4, a part of the detailed configuration of the solid oxide fuel cell cartridge 102 shown in FIG. 2 is omitted for clarity of illustration.

The plurality of cell stacks 110 of the solid oxide fuel cell cartridge 102 respectively have ends vicinities of which extend to the upper heat insulating body 124a and the lower heat insulating body 124b in order to collect electricity generated in each cell stack 110 outside the upper heat insulating body 124a and the lower heat insulating body 124b, and the vicinities of the ends of the respective cell stacks 110 are electrically connected to each other (detailed illustration is omitted in FIG. 4, but actually, the collectors 140 (see FIG. 2) of the respective cell stacks 110 are electrically connected to each other).

In the example of FIG. 4, the respective cell stacks 110 are connected in series with each other by the current collection mechanism 112, thereby deriving the electric power derived from the respective cell stacks 110 to the outside of the solid oxide fuel cell cartridge 102. Such current collection mechanism 142 includes a positive-electrode conductive wire 144a and a negative-electrode conductive wire 144b derived to the outside as a positive electrode and a negative electrode of the solid oxide fuel cell cartridge 102, and intermediate conductive wires 146a, 146b, . . . , 146e connecting the respective cell stacks 110.

The positive-electrode conductive wire 144a and the negative-electrode conductive wire 144b of the current collection mechanism 142 are connected to the current collection mechanism 142 of another solid oxide fuel cell cartridge 102 outside the solid oxide fuel cell cartridge 102, configuring such that electricities generated by the respective solid oxide fuel cell cartridges 102 are connected in series or in parallel and then derived to the outside of the solid oxide fuel cell module 100. The DC power derived to the outside is converted into predetermined AC power by an inverter or the like and supplied to a power load.

By the way, a binder component containing a metal element may be used for the upper heat insulating body 124a, and the lower heat insulating body 124b far the purpose of securing moldability, strength/workability, or the like. The binder component of this kind is used which contains an alkali metal (Li, Na, K, Rb, Cs) as a stabilizer for colloidal silica ($SiO_2$ or its hydrate), for example.

Further, in the vicinities of the through holes (that is, the oxidant supply gap 138a and the oxidant exhaust gap 138b) of the upper heat insulating body 124a and the lower heat insulating body 124b, it is designed such that not a little clearance is secured between the surfaces of the cell stacks 110 inserted through the through holes and the surfaces of the upper heat insulating body 124a and the lower heat insulating body 124b. In reality, however, due to a factor such as a design error, the surfaces of the cell stacks 110 may contact the surface of at least either of the upper heat insulating body 124a or the lower heat insulating body 124b.

If at least either of the upper heat insulating body 124a or the lower heat insulating body 124b including such binder component is in contact with the cell stacks 110 for a long period of time under a high-temperature environment, the concentration of the aforementioned metal element progresses in at least either of the upper heat insulating body 124a or the lower heat insulating body 124b and a molten phase may be formed in an operating temperature range. For example, if the heat insulating body, which contains, as the binder component, colloidal silica including sodium as the metal element, is in contact with the seal insulating film 144, which is disposed on the cell stack 110 and contains alumina ($Al_2O_3$), for the long period of time under the high-temperature environment, a melting point decreases and a molten phase may be formed at around 790° C. Under such circumstances, if a relatively high negative potential is applied between the cell stack 110 and at least either of the upper heat insulating body 124a or the lower heat insulating body 124b, an ionized concentrated metal element moves from a side of at least either of the upper heat insulating body 124a or the lower heat insulating body 124b to a cell stack 110 side, which causes alternation of the seal insulating film 144 on the cell stacks 110 or deterioration in insulating property. If this progresses further, electrical breakdown may be caused by a short-circuit current.

Such problem can preferably be solved by providing a metal ion suppression means 150 described below. The metal ion transfer suppression means 150 is configured to suppress transfer of metal ions of the metal element from at least either of the upper heat insulating body 124a or the lower heat insulating body 124b toward the seal insulating film 144. By providing such metal ion suppression means 150, even if at least either of the upper heat insulating body 124a or the lower heat insulating body 124b is in contact with the cell stacks 110 for the long period of time under the high-temperature environment, it is possible to effectively suppress that the metal ions originating in the binder component contained in at least either of the upper heat insulating body 124a or the lower heat insulating body 124b transfer to the cell stack 110 side.

The metal ion transfer suppression means 150 shown in FIG. 4 includes a connection line 152 electrically connecting the cell stacks 110 with the upper heat insulating body 124a and the lower heat insulating body 124b such that a potential of the cell stacks 110 with respect to at least either of the upper heat insulating body 124a or the lower heat insulating body 124b is limited to a threshold or less. Since the connection line 152 electrically connects the cell stacks 110 with the upper heat insulating body 124a and the lower heat insulating body 124b as described above, the potential of the cell stacks 110 with respect to at least either of the upper heat insulating body 124a or the lower heat insulating body 124b can be limited to the threshold or less. Thus, even if the molten phase is formed in the case where at least either of the upper heat insulating body 124a or the lower heat insulating body 124b is in contact with the cell stacks 110 for the long period of time under the high-temperature environment, it is possible to suppress that the metal ions ($Na^+$ or $Si^{2+}$) which are positive ions transfer from at least either of the upper heat insulating body 124a side or the lower heat insulating body 124b side to the cell stack 110 side. As a result, it is possible to prevent the alternation of the seal insulating film 111 disposed on the cell stack 110 or the deterioration in insulating property.

The connection line 152 connects any of the positive-electrode conductive wire 144a, the negative-electrode conductive wire 144b, the intermediate conductive wires 146a, 146b, . . . , 146e electrically connected to the cell stacks 110 with the upper heat it body 124a and the lower heat insulating body 124b. The connection destination of the connection line 152 may be decided according to the magnitude of the threshold. For example, as the connection destination of the connection line 152 is set at a position closer to the positive-electrode conductive wire 144a, the threshold is decreased and the aforementioned effect of suppressing metal ion transfer is also reduced. On the other hand, as the connection destination of the connection line 152 is set at a position closer to the negative-electrode conductive wire 144b, the threshold is increased and the aforementioned effect of suppressing metal ion transfer is also enhanced.

FIG. 4 illustrates the connection line 152 connecting the intermediate conductive wire 146c with the upper heat insulating body 124a and the and lower heat insulating body 124b. However, as indicated by a dashed line in the figure, the upper heat insulating body 124a and the and lower heat insulating body 124b may be connected to the negative-electrode conductive wire 144b. In the case where the upper heat insulating body 124a and the and lower heat insulating body 124b are connected to the negative-electrode conductive wire 144b, since the upper heat insulating body 124a and the and lower heat insulating body 124b are connected to the negative-electrode side compared to the case where the upper heat insulating body 124a and the and lower heat insulating body 124b are connected to the intermediate conductive wires 146a, 146b, . . . 146e, it is possible to obtain the greater effect of suppressing the metal ion transfer. However, the potential on the positive-electrode side increases as the connection destination of the connection line 152 is brought closer to the negative-electrode side, and thus it is preferable to decide the connection destination in consideration of the trade-off.

Figure 5:
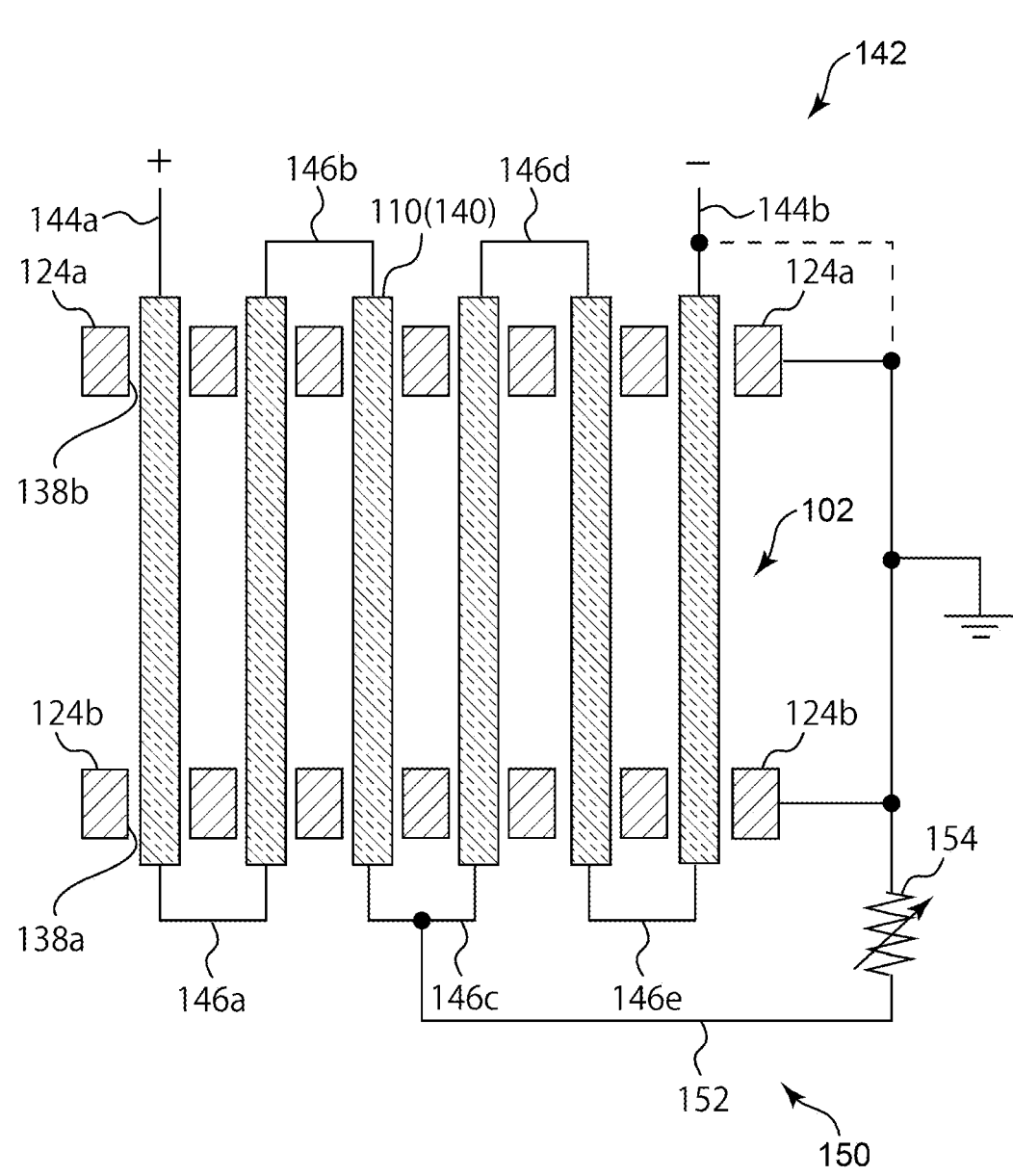
FIG. 5 is a first modified example of FIG. 4.

FIG. 5 is a first modified example of FIG. 4. In the first modified example, the metal ion transfer suppression means 150 further includes a variable resistor 154 disposed on the aforementioned connection line 152. The variable resistor 154 is a resistor which is disposed in series with the connection line 152 and has a resistance value configured to be variable. By adjusting the resistance value of the variable resistor 154 on the connection line 152, it is possible to optionally adjust the magnitude of the potential of the cell stacks 110 with respect to the upper heat insulating body 124a and the lower heat insulating body 124b. Thus, by adjusting the magnitude of the threshold while fixing the connection destination of the connection line 152, it is possible to easily adjust the magnitude of the aforementioned effect of suppressing metal ion transfer.

Figure 6:
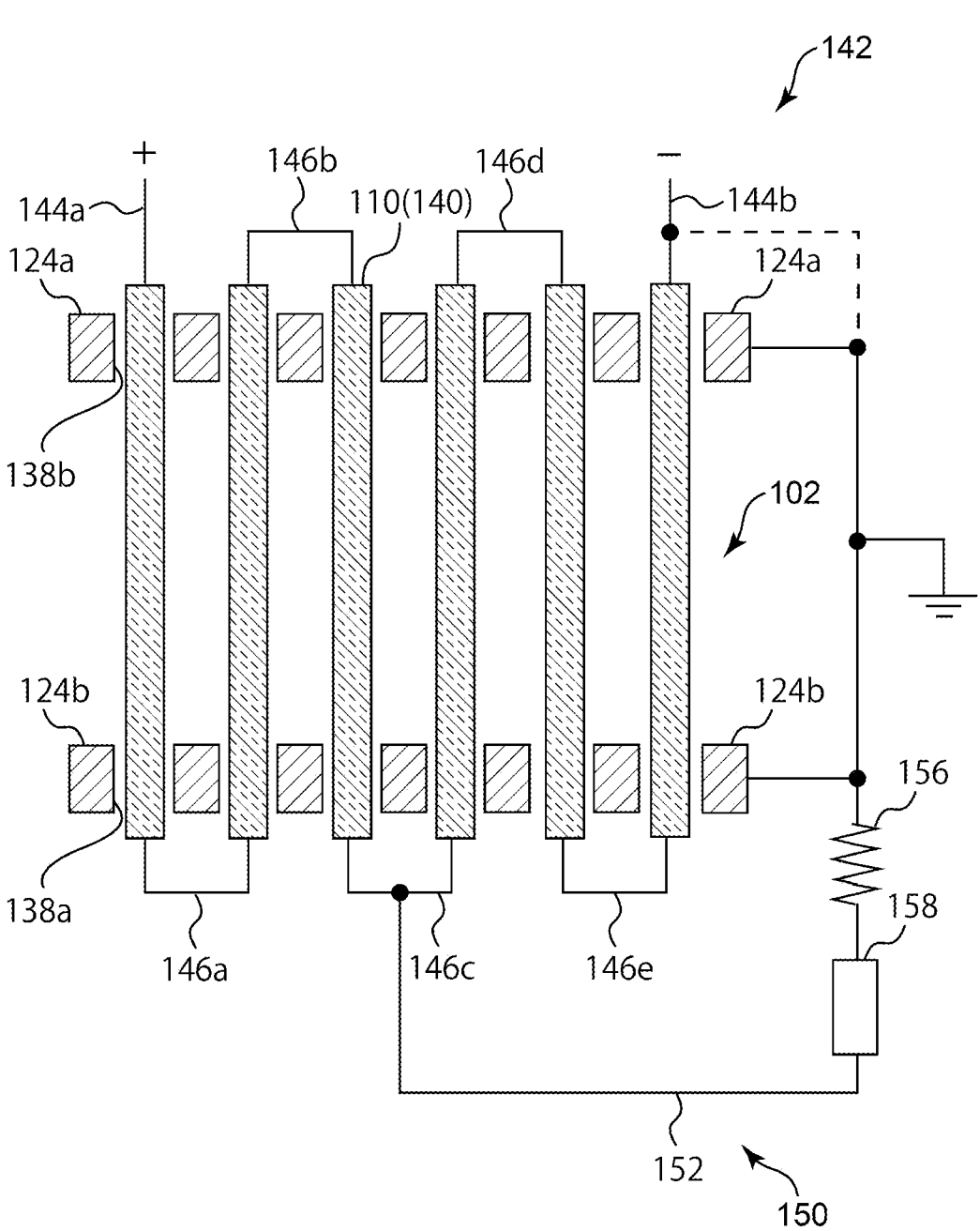
FIG. 6 is a second modified example of FIG. 4.

FIG. 6 is a second modified example of FIG. 4. In the second modified example, the metal ion transfer suppression means 150 further includes a fixed resistor 156 disposed on the aforementioned connection line 152 and a DC power supply 158 capable of supplying DC power to the fixed resistor 156. Although the DC power supply 158 is disposed in series with the fixed resistor 156 in FIG. 6, the DC power supply 158 may be disposed in parallel to the fixed resistor 156. A potential applied to the filed resistor 156 is adjusted by adjusting an output of the DC power supply 158 on the connection line 152, making it possible to optionally adjust the magnitude of the potential of the cell stacks 110 with respect to the upper heat insulating body 124a and the lower heat insulating body 124b. Thus, by adjusting the magnitude of the threshold while fixing the connection destination of the connection line 152, it is possible to easily adjust the magnitude of the aforementioned effect of suppressing metal ion transfer.

The metal ion transfer suppression means 150 according to another embodiment may include a temperature control unit 160 for controlling the temperature of at least one of the upper heat insulating body 124a, the lower heat insulating body 124b, or the seal insulating film 144 to be an allowable temperature threshold or less. The temperature control unit 160 controls the temperature of at least one of the upper heat insulating body 124a, the lower heat insulating body 124b, or the seal insulating film 144 which may contact with each other, making it possible to effectively suppress the generation of the molten phase even if the upper heat insulating body 124a, the lower heat insulating body 124b, and the seal insulating film 144 are in contact with each other for the long period of time under the high-temperature environment.

Figure 7:
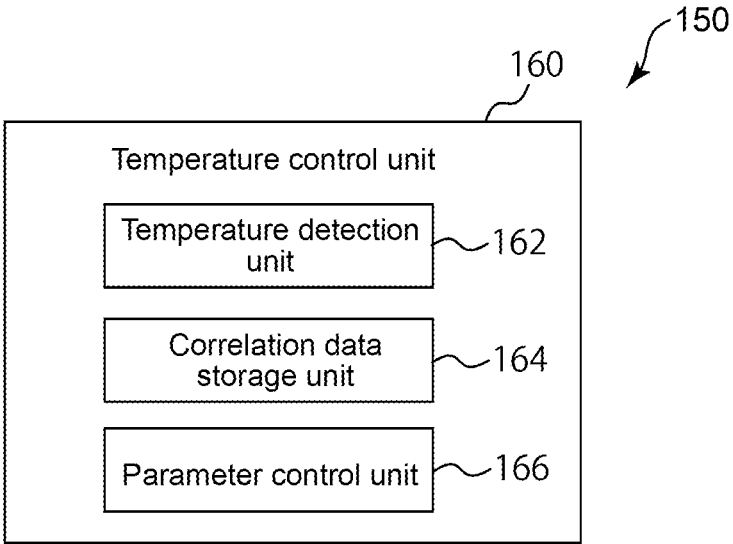
FIG. 7 is a block diagram showing a temperature control unit of a metal ion transfer suppression means according to another embodiment.
Figure 8:
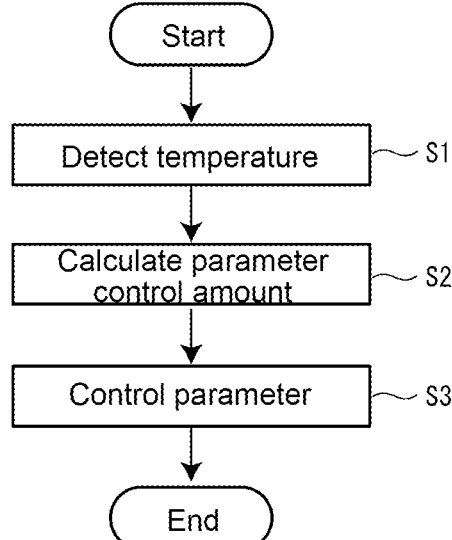
FIG. 8 is a flowchart showing steps of a temperature control method by the temperature control unit of FIG. 7.

FIG. 7 is a block diagram showing the temperature control unit 160 of the metal ion transfer suppression means 150 according to another embodiment. FIG. 8 is a flowchart showing steps of a temperature control method by the temperature control unit 160 of FIG. 7.

The temperature control unit 160 shown in FIG. 7 is configured to execute the temperature control method shown in FIG. 8 by installing a predetermined program in an electronic computation device such as a computer. The temperature control unit 160 includes a temperature detection unit 162, a correlation data storage unit 164, and a parameter control unit 166. The temperature detection unit 162 detects the temperature of at least one of the upper heat insulating body 124a, the lower heat insulating body 124b, or the seal insulating film 144 whose temperature is to be managed as a measurement value of a temperature sensor such as a thermocouple. The correlation data storage unit 164 stores in advance correlation data between the temperature detection unit 162 and a parameter to be controlled. The parameter control unit 166 controls the parameter to be controlled.

In the temperature control unit 160 having such configuration, as shown in FIG. 8, first, the temperature detection unit 162 acquires the temperature of at least one of the upper heat insulating body 124a, the lower heat insulating body 124b, or the seal insulating film 144 whose temperature is to be managed (step S1). Then, the temperature control unit 160 calculates a parameter control amount for adjusting the temperature detection value by the temperature detection unit 162 to a target temperature (allowable temperature threshold or less), based on the correlation data stored in the correlation data storage unit 164 (step S2). Then, the parameter control unit 166 controls the parameter based on the parameter control amount calculated in step S2 (step S3). Thus, the temperature of at least one of the upper heat insulating body 124*a*, the lower heat insulating body 124*b*, or the seal insulating film 144 can be limited to the allowable temperature threshold or less in a controlled manner.

As the parameters handled by the parameter control unit 166, it is possible to adopt, for example, an oxidizing gas supply temperature to the cell stack 110, the fuel gas/oxidizing gas supply ratio, the amount of fuel added to the oxidizing gas in temperature rise control performed at the cold start of the solid oxide fuel cell module 100, and the like.

Figure 9:
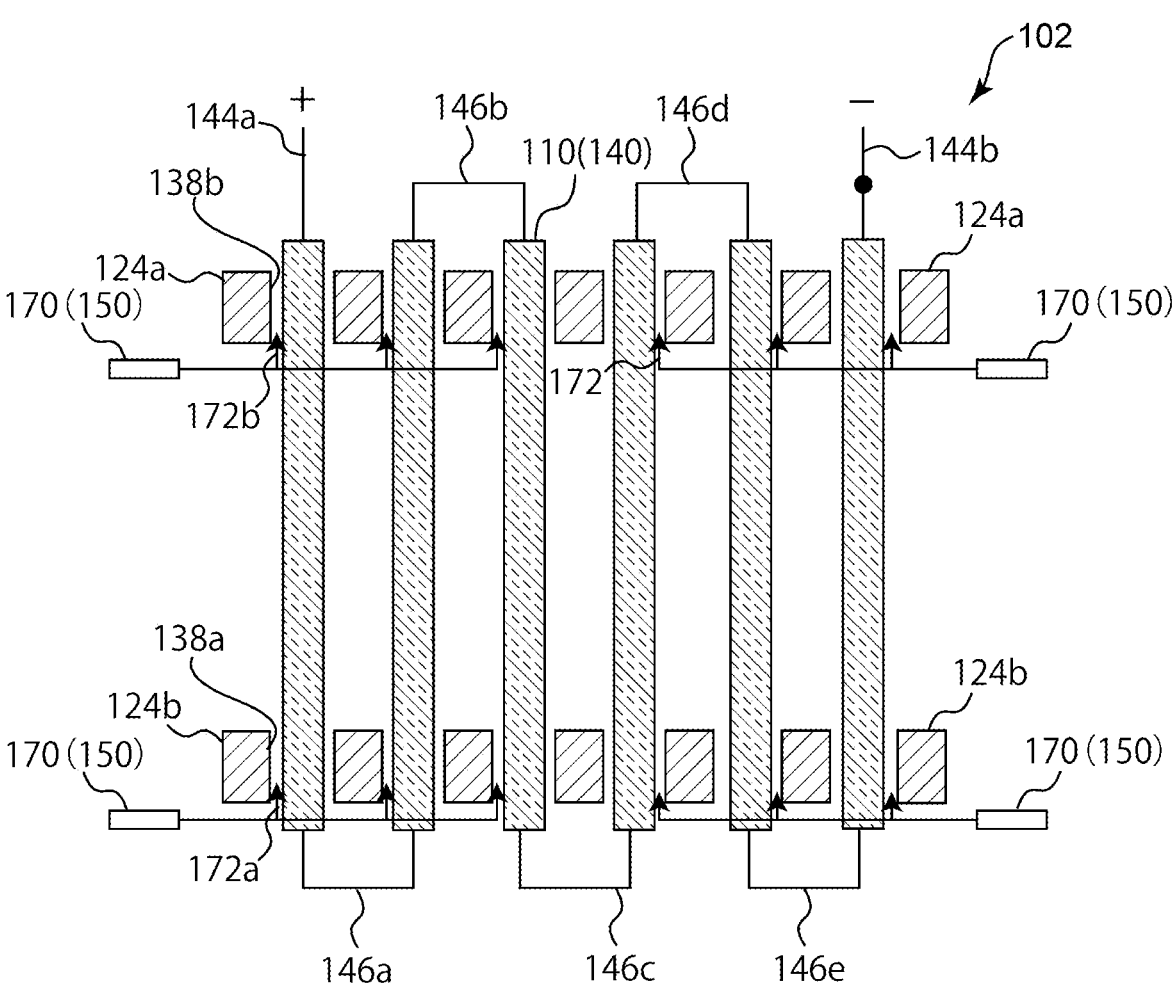
FIG. 9 is a schematic configuration view showing the metal ion transfer suppression means according to another embodiment.

FIG. 9 is a schematic configuration view showing the metal ion transfer suppression means 150 according to another embodiment. The metal ion transfer suppression means 150 shown in FIG. 9 includes a cooling medium supply unit 170 configured to supply a cooling medium to clearances (that is, the oxidant supply gap 138*a* and the oxidant exhaust gap 138*b*) between the seal insulating film 144 and the heat insulating bodies (the upper heat insulating body 124*a* and the lower heat insulating body 124*b*). The cooling medium is, for example, an oxidizing gas.

The cooling medium supply unit 170 includes a plurality of nozzle portions 172*a* and 172*b* for ejecting the cooling medium to the oxidant supply gap 138*a* and the oxidant exhaust gap 138*b* corresponding to each cell stack 110, respectively. The nozzle portion 172*a* corresponding to the oxidant supply gap 138*a* is disposed such that the cooling medium is ejected from the outside toward the reaction room 112 along the flow of the oxidizing gas flowing through the oxidant supply gap) 138*a*. The nozzle portion 172*b* corresponding to the oxidant exhaust gap 138*b* is disposed such that the cooling medium is ejected from the reaction room 112 toward the outside along the flow of the oxidizing gas flowing through the oxidant exhaust gap 138*b*. Thus, the cooling medium supplied from the cooling medium supply unit 170 decreases the temperature in the oxidant supply gap 138*a* or the oxidant exhaust gap 138*b*, suppressing the formation of the molten phase.

The cooling medium supply unit 170 shown in FIG. 9 is merely one aspect, and it is possible to widely adopt the configuration where the cooling medium is supplied to the oxidant supply gap 138*a* or the oxidant exhaust gap 138*b*.

Figure 10:
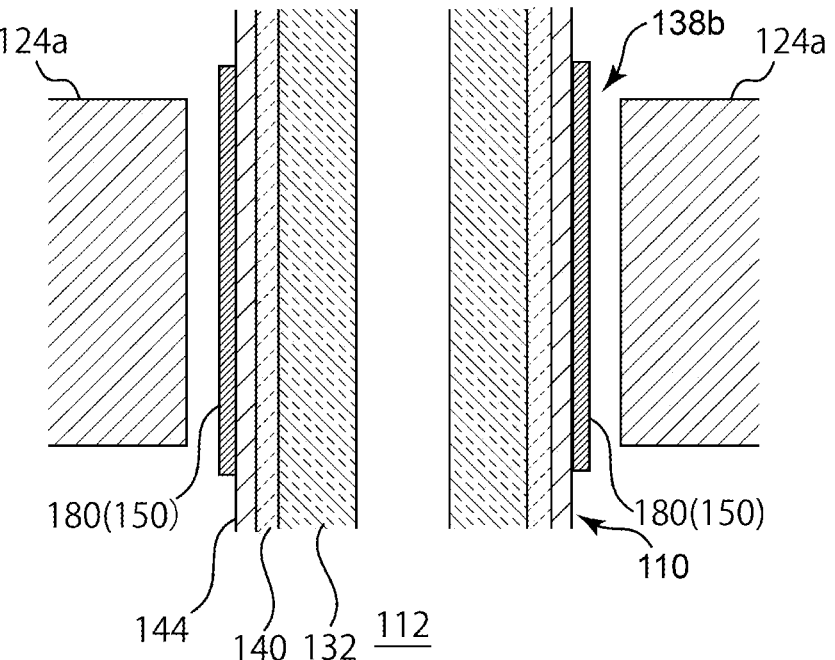
FIG. 10 is a schematic configuration view showing the metal ion transfer suppression means according to another embodiment.

FIG. 10 is a schematic configuration view showing the metal ion transfer suppression means 150 according to another embodiment. The metal ion transfer suppression means 150 includes an insulating member 180 disposed to include a region where the seal insulating film 144 and the upper heat insulating body 124*a*, face each other in the oxidant exhaust gap 138*b*.

In FIG. 10, in the oxidant exhaust gap 138*b*, the insulating member 180 is disposed over a region of a region on the seal insulating film 144 on the cell stack 110 side facing the upper heat insulating body 124*a*. Since the insulating member 180 is interposed between the upper heat insulating body 124*a* and the seal insulating film 144 in the oxidant exhaust gap 138*b* as described above, the upper heat insulating body 124*a* does not directly contact the seal insulating film 144 and even if the cell stack 110 contacts the upper heat insulating body 124*a*, it is possible to structurally prevent metal ions from being transferred to the seal insulating film 144.

Such insulating member 180 may be formed of a material having a lower electrical conductivity than the insulating film. Thus, the insulating member 180 can exhibit sufficient insulating performance with a relatively thin film thickness and can effectively prevent metal ion transfer.

Although FIG. 10 shows the case where the insulating member 180 is disposed on the cell stack 110 side, the insulating member 180 may be disposed on the upper heat insulating body 124*a* side. In this case as well, since the insulating member 180 is interposed, the upper heat insulating body 124*a* does not directly contact the seal insulating film 144 and even if the cell stack 110 contacts the upper heat insulating body 124*a*, it is possible to structurally prevent metal ions from being transferred to the seal insulating film 144.

Further, although FIG. 10 shows the case where the insulating member 180 is configured as a separate member from the sealing insulating film 144, the insulating member 180 may be configured integrally with the sealing insulating film 144. In this case, the sealing insulating film 144 formed integrally with the insulating member 180 may be configured to at least partially have a large film thickness over the region facing the upper heat insulating body 124*a* in the oxidant exhaust gap 138*b*.

Although FIG. 10 shows the insulating member 180 disposed in the oxidant exhaust gap 138*b*, the insulating member 180 may similarly be disposed in the oxidant supply gap 138*a*.

As described above, since the solid oxide fuel cell module 100 and the solid oxide fuel cell cartridge 102 according to each embodiment described above include the metal ion transfer suppression means, it is possible to prevent alternation of the insulating film or deterioration in insulating property when the heat insulating body is in contact with the insulating film disposed on the lead film for the long period of time under the high-temperature environment.

In the above-described embodiment, since the fuel gas supply chamber 114, the fuel gas exhaust chamber 116, the oxidant supply chamber 118, and the oxidant exhaust chamber 120 are disposed as shown in FIG. 2, the solid oxide fuel cell cartridge 102 has the structure where the fuel gas and the oxidizing gas oppositely flow inside and outside the cell stack 101. However, the solid oxide fuel cell cartridge 102 may have another structure. For example, the oxidizing gas may flow inside and outside the cell stack 110 in parallel, or may flow in a direction orthogonal to the longitudinal direction of the cell stack 110.

As for the rest, without departing from the spirit of the present disclosure, it is possible to replace the constituent elements in the above-described embodiments with known constituent elements, respectively, as needed and further, the above-described embodiments may be combined as needed.

The contents described in the above embodiments would be understood as follows, for instance.

(1) A heat insulation structure for a high-temperature reaction room actor ding to an embodiment of the present disclosure includes: a cell stack (such as the cell stack 110 of the above-described embodiment) including at least one reaction room (such as the reaction room 112 of the above-described embodiment) with a single fuel cell (such as the single fuel cell 126 of the above-described embodiment); a heat insulating body (such as the upper heat insulating body 124*a* or the lower heat insulating body 124*b* of the above-described embodiment) which contains a binder component including a metal element, at least partially surrounds the reaction room, and is arranged so as to face an insulating film (such as the seal insulating film 144 of the above-described embodiment) disposed on the cell stack; and a metal ion transfer suppression means (such as the metal ion transfer suppression means 150 of the above-described embodiment) configured to suppress transfer of metal ions originating in the metal element from the heat insulating body toward the insulating film.

With the above configuration (1), since the solid oxide fuel cell cartridge includes the metal ion transfer suppression means, even if the heat insulating body is in contact with the cell stack for a long period of time under a high-temperature environment, it is possible to suppress that the metal ions, which originate in the metal element in the binder component contained in the heat insulating body, are transferred to the insulating film on the cell stack side.

(2) In one aspect, in the above configuration (1), the metal ion transfer suppression means includes a connection line (such as the connection line 152 of the above-described embodiment) electrically connecting the cell stack and the insulating body such that a potential of the cell stack with respect to the heat insulating body is limited to a threshold or less.

With the above configuration (2), since the cell stack and the heat insulating body are electrically connected by the connection line, the potential of the cell stack with respect to the heat insulating body can be limited to the threshold or less. Thus, even if the molten phase is formed in the case where the heat insulating body is in contact with the cell stack for the long period of time under the high-temperature environment, it is possible to suppress that the metal ions, which originate in the metal element included in the binder component contained in the heat insulating body, are transferred to the insulating film on the cell stack side.

(3) In one aspect, in the above configuration (2), the at least one cell stack includes a plurality of cell stacks electrically connected to each other by an intermediate connection line (such as the intermediate connection lines 146a to 146e of the above-described embodiment), and the connection line connects the intermediate connection line to the heat insulating body.

With the above configuration (3), since the connection line is connected between the heat insulating body and the intermediate connection line connecting the plurality of cell stacks, the potential of the cell stack with respect to the heat insulating body can be limited to the threshold or less. In particular, in the case where the plurality of intermediate connection lines are provided, the magnitude of the potential of the cell stack with respect to the heat insulating body can optionally be adjusted by selecting the intermediate connection line connecting the connection line.

(4) In one aspect, in the above configuration (2) or (3), the metal ion transfer suppression means includes a variable resistor (such as the variable resistor 154 of the above-described embodiment) disposed on the connection line.

With the above configuration (4), the variable resistor is disposed on the connection line electrically connecting the cell stack and the heat insulating body. In this case, by adjusting a resistance value of the variable resistor, it is possible to optionally adjust the magnitude of the potential of the cell stack with respect to the heat insulating body.

(5) In one aspect, in the above configuration (2) or (3), the metal ion transfer suppression means includes a fixed resistor (such as the filed resistor 156 of the above-described embodiment) disposed on the connection line, and a DC power supply (such as the DC power supply 158 of the above-described embodiment) capable of supplying DC power to the fixed resistor.

With the above configuration (5), the fixed resistor and the DC power supply are disposed on the connection line electrically connecting, the cell stack and the heat insulating body. In this case, by adjusting an output of the DC power supply, it is possible to optionally adjust the magnitude of the potential of the cell stack with respect to the heat insulating body.

(6) In one aspect, in any one of the above configurations (1) to (5), the metal ion transfer suppression means includes a temperature control unit (such as the temperature control unit 160 of the above-described embodiment) for controlling a temperature of the insulating film to be an allowable temperature threshold or less.

With the above configuration (6), since the temperature control unit controls the temperature of the insulating film to be the allowable temperature threshold or less, it is possible to effectively suppress the formation of the molten phase even if the heat insulating body is in contact with the cell stack for the long period of time under the high-temperature environment. As a result, it is possible to suppress that the metal ions, which originate in the binder component contained in the heat insulating body, are transferred to the insulating film on the cell stack side.

(7) In one aspect, in the above configuration (6), the metal ion transfer suppression means controls the temperature of the insulating film by adjusting a supply ratio of a fuel gas and an oxidizing gas to the cell stack or a supply temperature of the oxidizing gas.

With the above configuration (7), by adjusting these parameters, it is possible to control the temperature of the insulating film to be the allowable temperature threshold or less.

(8) In one aspect, in any one of the above configurations (1) to (7), the metal ion transfer suppression means includes a cooling medium supply unit (such as the cooling medium supply unit 170 of the above-described embodiment) configured to supply a cooling medium to a clearance (such as the oxidant supply gap 138a or the oxidant exhaust gap 138b of the above-described embodiment) between the insulating film m the heat insulating body.

With the above configuration (8), since the cooling medium is supplied to the clearance between the insulating film and the heat insulating body, it is possible to effectively suppress the formation of the molten phase. As a result, it is possible to suppress that the metal ions, which originate in the binder component contained in the heat insulating body, are transferred to the insulating film on the cell stack side.

(9) In one aspect, in any one of the above configurations (1) to (8), the metal ion transfer suppression means is an insulating member (such as the insulating member 180 of the above-described embodiment) disposed on a surface of at least either of the insulating film or the heat insulating body in a region where the insulating film and the heat insulating body face each other.

With the above configuration (9), the insulating member is disposed on the surface of at least either of the insulating film or the heat insulating body Thus, even if the heat insulating body is in contact with the cell stack for the long period of time under the high-temperature environment, since the insulating member is interposed between the heat insulating body and the insulating film, it is possible to structurally suppress that the metal ions, which originate in the binder component contained in the heat insulating body, are transferred to the insulating film on the cell stack side.

(10) In one aspect, in the above configuration (9), the insulating member is formed of a material having a lower electrical conductivity than the insulating film.

With the above configuration (10), since the insulating member is formed of the material having the lower electrical conductivity than the insulating film, even if the heat insulating body is n contact with the cell stack for the long period of tune under the high-temperature environment, it is possible to suppress that the metal ions, which originate in the binder component contained in the heat insulating body, are transferred to the insulating film on the cell stack side.

(11) In one aspect, in any one of the above configurations (1) to (10), the binder component includes the metal element as a stabilizer for colloidal silica.

With the above configuration (11), in the solid oxide fuel cell cartridge that includes the heat insulating body which uses the binder component including the metal element as the stabilizer for colloidal silica, even if the heat insulating body is in contact with the cell stack for the long period of time under the high-temperature environment, it is possible to suppress that the metal ions, which originate in the binder component contained in the heat insulating body, are transferred to the insulating film on the cell stack side.

(12) In one aspect, in any one of the above configurations (1) to (11), the metal element is an alkali metal.

With the above configuration (12), in the Solid oxide fuel cell cartridge that includes the heat insulating body which uses the binder component including the alkali metal as the metal element, even if the heat insulating body is in contact With the cell stack for the long period of time under the high-temperature environment, it is possible to suppress that the metal ions, which originate in the binder component contained in the heat insulating body, ore transferred to the insulating film on the cell stack side.

(13) In one aspect, in any one of the above configurations (1) to (12), the heat insulating body has a through hole (such as the oxidant supply gap 138a or the oxidant exhaust gap 138b of the above-described embodiment) through which the cell stack is insertable, and the insulating film faces the heat insulating body when the cell stack is inserted through the through hole.

With the above configuration (13), in the solid oxide fuel cell cartridge where the cell stack is inserted through the through hole formed in the heat insulating body, even if the heat insulating body is in contact with the cell stack or the long period of time under the high-temperature environment, it is possible to suppress that the metal ions, which originate in the binder component contained in the heat insulating body, are transferred to the insulating film on the cell stack side.

(14) In one aspect, in any one of the above configurations (1) to (13), the cell stack is a solid oxide fuel cell in which the reaction room is a power generation room.

With the above configuration (14), in the solid oxide fuel cell in which the reaction room is the power generation room described above, even if the heat insulating body is in contact with the cell stack for the long period of time under the high-temperature environment, it is possible to suppress that the metal ions, which originate in the binder component contained in the heat insulating body, are transferred to the insulating film on the cell stack side.

(15) In one aspect, in any one of the above configurations (1) to (13), the cell stack is a solid oxide electrolytic cell in which the reaction room is a hydrogen generation room.

With the above configuration (15), the present disclosure is also applicable to a solid oxide electrolytic cell (SOEC) cartridge for producing hydrogen by applying electric power with the same configuration as a single fuel cell cartridge. In that case, the power generation room room in the above-described embodiment can be replaced with the hydrogen generation room for generating hydrogen without generating electricity.

REFERENCE SIGNS LIST

100 Solid oxide fuel cell module
102 Solid oxide fuel cell cartridge
104 Pressure vessel
106 Fuel gas supply pipe
106a Fuel gas supply branch pipe
108 Fuel gas exhaust pipe
108a Fuel gas exhaust branch pipe
110 Cell stack
112 Reaction room
114 Fuel gas supply chamber
116 Fuel gas exhaust chamber
118 Oxidant supply chamber
120 Oxidant exhaust chamber
122a Upper tube plate
122b Lower tube plate
124a Upper heat insulating body
124b Lower heat insulating body
126 Single fuel cell
128a Upper casing
128b Lower casing
130a Fuel gas supply hole
130b Fuel gas exhaust hole
132 Substrate tube
134a Oxidant supply hole
134b Oxidant exhaust hole
138a Oxidant supply gap
138b Oxidant exhaust gap
142 Current collection mechanism
144 Seal insulating film
144a Positive-electrode conductive wire
144b Negative-electrode conductive wire
146a-146e Intermediate connection line
150 Metal ion transfer suppression means
152 Connection line
154 Variable resistor
156 Fixed resistor
158 DC power supply
160 Temperature control unit
162 Temperature detection unit
164 Correlation data storage unit
166 Parameter control unit
170 Cooling medium supply unit
172 Nozzle portion
180 Insulating member

The invention claimed is:

1. A heat insulation structure for a high-temperature reaction room, comprising:

a cell stack including at least one reaction room;

a heat insulating body which contains a binder component including a metal element, at least partially surrounds the reaction room, and is arranged so as to face an insulating film disposed on the cell stack; and a metal ion transfer suppression means configured to suppress transfer of metal ions originating in the metal element from the heat insulating body toward the insulating film.

2. The heat insulation structure for the high-temperature reaction room according to claim 1, wherein the metal ion transfer suppression means includes a connection line electrically connecting the cell stack and the insulating body such that a potential of the cell stack with respect to the heat insulating body can be limited to a threshold or less.

3. The heat insulation structure for the high-temperature reaction room according to claim 2, wherein the at least one cell stack includes a plurality of cell stacks electrically connected to each other by an intermediate connection line, and wherein the connection line connects the intermediate connection line to the heat insulating body.

4. The heat insulation structure for the high-temperature reaction room according to claim 2, wherein the metal ion transfer suppression means further includes a variable resistor disposed on the connection line.

5. The heat insulation structure for the high-temperature reaction room according to claim 2, wherein the metal ion transfer suppression means further includes a fixed resistor disposed on the connection line, and a DC power supply capable of supplying DC power to the fixed resistor.

6. The heat insulation structure for the high-temperature reaction room according to claim 1, wherein the metal ion transfer suppression means includes a temperature control unit for controlling a temperature of the insulating film to be an allowable temperature threshold or less.

7. The heat insulation structure for the high-temperature reaction room according to claim 6, wherein the metal ion transfer suppression means controls the temperature of the insulating film by adjusting a supply ratio of a fuel gas and an oxidizing gas to the cell stack or a supply temperature of the oxidizing gas.

8. The heat insulation structure for the high-temperature reaction room according to claim 1, wherein the metal ion transfer suppression means includes a cooling medium supply unit configured to supply a cooling medium to a clearance between the insulating film and the heat insulating body.

9. The heat insulation structure for the high-temperature reaction room according to claim 1, wherein the metal ion transfer suppression means is an insulating member disposed on a surface of at least either of the insulating film or the heat insulating body in a region where the insulating film and the heat insulating body face each other.

10. The heat insulation structure for the high-temperature reaction room according to claim 9, wherein the insulating member is formed of a material having a lower electrical conductivity than the insulating film.

11. The heat insulation structure for the high-temperature reaction room according to claim 1, wherein the binder component includes the metal element as a stabilizer for colloidal silica.

12. The heat insulation structure for the high-temperature reaction room according to claim 1, wherein the metal element is an alkali metal.

13. The heat insulation structure for the high-temperature reaction room according to claim 1, wherein the heat insulating body has a hole through which the cell stack is insertable, and wherein the insulating film faces the heat insulating body when the cell stack is inserted through the hole.

14. The heat insulation structure for the high-temperature reaction room according to claim 1, wherein the cell stack is a solid oxide fuel cell in which the reaction room is a power generation room.

15. The heat insulation structure for the high-temperature reaction room according to claim 1, wherein the cell stack is a solid oxide electrolytic cell in which the reaction room is a hydrogen generation room.

* * * * *